US006270915B1

(12) United States Patent
Turpin et al.

(10) Patent No.: US 6,270,915 B1
(45) Date of Patent: *Aug. 7, 2001

(54) GYPSUM BOARD/INTUMESCENT MATERIAL CEILING BOARDS

(75) Inventors: Kenneth A. Turpin, Delta (CA); Monroe W. Shumate, Littleton, CO (US); Jesse J. Beitel, III, Ellicott City, MD (US)

(73) Assignee: Johns Manville International, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/326,232

(22) Filed: Jun. 4, 1999

(51) Int. Cl.[7] ............... E04C 2/16; E04C 2/24; B27N 9/00; C09K 21/00
(52) U.S. Cl. ............ 428/703; 428/70; 428/701; 428/921; 52/232; 52/381; 52/383; 52/784.11; 52/787.11
(58) Field of Search ............... 428/70, 702, 703, 428/920, 921, 294.7; 106/18.14, 18.15, 18.16, 18.17, 18.18, 18.19, 18.31, 18.26, 16; 52/232, 381, 383, 784.11, 787.11, 800.12

(56) References Cited

U.S. PATENT DOCUMENTS

| Re. 34,951 | 5/1995 | Slosberg et al. . |
| 3,574,644 | 4/1971 | Olstowski et al. . |
| 3,642,531 | 2/1972 | Peterson . |
| 3,945,962 | 3/1976 | Clark . |
| 4,043,950 | 8/1977 | Wilmsen et al. . |
| 4,191,675 | 3/1980 | Inagaki et al. . |
| 4,222,926 | 9/1980 | Mizuno et al. . |
| 4,273,879 | 6/1981 | Langer et al. . |
| 4,284,550 | 8/1981 | Mizuno et al. . |
| 4,563,491 | 1/1986 | Comune . |
| 4,689,256 | 8/1987 | Slosberg et al. . |
| 5,057,367 | 10/1991 | Morii et al. . |
| 5,132,054 | 7/1992 | Stahl . |
| 5,175,197 | 12/1992 | Gestner et al. . |
| 5,232,976 | 8/1993 | Horacek et al. . |
| 5,338,349 | 8/1994 | Farrar . |
| 5,481,834 | * 1/1996 | Kowalczyk et al. . |
| 5,498,466 | 3/1996 | Navarro et al. . |
| 6,102,995 | * 8/2000 | Hutchings et al. . |

* cited by examiner

*Primary Examiner*—Deborah Jones
*Assistant Examiner*—Jennifer McNeil
(74) *Attorney, Agent, or Firm*—John Lister

(57) ABSTRACT

A gypsum board/intumescent material ceiling board includes a gypsum board and a fire-resistive barrier. A first major surface of the gypsum board is an upper side for abutting framing and a second major surface of the gypsum board is an underside for facing a room interior. The fire-resistive barrier is a layer of intumescent coating material applied to and coextensive with one of the major surfaces of the gypsum board. The intumescent coating material contains expandable graphite and a corrosion inhibitor in sufficient quantities to provide a corrosion inhibiting layer on metal surfaces, such as the surfaces of metal fasteners, with which the intumescent coating material comes in contact. In addition, the intumescent coating material has a pH greater than 7.0 to reduce corrosive properties of the intumescent material and provide a chemical environment conducive to the forming of the corrosion inhibiting layer by the corrosion inhibitor.

14 Claims, 1 Drawing Sheet

GYPSUM BOARD/INTUMESCENT MATERIAL CEILING BOARDS

BACKGROUND OF THE INVENTION

The present invention relates to ceiling boards and ceilings with fire-resistive barriers and, in particular, to ceiling boards and ceilings which are made of gypsum boards with a layer of an intumescent material, containing expandable particulate graphite and a corrosion inhibitor, applied to a major surface of the gypsum boards to form a fire-resistive barrier.

Ceilings for many commercial and residential structures are typically made with gypsum boards that are secured to wood or metal framing with metal screws or nails. Several types of gypsum boards are used for these ceiling applications. The first type of gypsum board is a regular gypsum board, such as that marketed by GP Gypsum Corporation as regular gypsum board under the trademark "GyProc" for use in wall and ceiling applications. The regular gypsum boards have non-combustible, dimensionally stable non-reinforced gypsum cores. The second type of gypsum board is a ceiling gypsum board, such as that marketed by GP Gypsum Corporation as a ceiling board under the trademarks "GyProc" "CD Ceiling Board" for use in ceiling applications. For comparable thicknesses, the ceiling gypsum boards are heavier than the regular gypsum boards and have non-combustible, dimensionally stable gypsum cores that are reinforced, e.g. with inorganic glass fibers. The third type of gypsum board is a gypsum board with a fire-resistive rating, such as that marketed by GP Gypsum Corporation under the trademarks "GyProc" "Fireguard" and "Fireguard" C gypsum board for use in wall and ceiling applications. For comparable thicknesses, the fire-resistive rated gypsum boards are heavier than either the regular gypsum boards or the ceiling gypsum boards and have non-combustible, dimensionally stable gypsum cores that are reinforced, e.g. with inorganic glass fibers. While all of these gypsum boards have cores made of non-combustible materials, the cores of these gypsum boards are all heat degradable and, after various periods of time, fail from an exposure to the heat from a fire.

Since the time lapse prior to failure from the heat of a fire progressively increases from the regular gypsum boards to the ceiling gypsum boards to the fire-resistive rated gypsum boards, for many applications, the ceiling gypsum boards are specified or required for a particular application rather than the regular gypsum boards and, for still other applications, the fire-resistive rated gypsum boards are specified or required rather than the regular or the ceiling gypsum boards. During construction, contractors sometimes install the wrong type of gypsum board and thus, the ceiling, as constructed, does not meet the requirements for that particular application. Currently, when this occurs, the contractor must remove the ceiling and replace it with a ceiling using the correct type of gypsum boards. This can be quite a costly procedure in materials, time and labor. However, currently, there are no other acceptable alternatives.

Intumescent materials, such as those disclosed in U.S. Pat. No. 3,574,644; issued Apr. 13, 1971; Franciszek Olstowski et al (hereinafter "the '644 patent), can be applied (as stated in column 3, lines 1–5 of the '644 patent) in the form of a coating to "normally combustible or heat degradable materials such as wood, fiber-board, plastics, insulative ceilings or wall panels, other cellulosic building materials, or the like" to increase the flame resistance of such normally combustible or heat degradable materials. These intumescent materials form passive fire protection systems which remain inactive until subjected to heat and temperatures such as those encountered from the flames of a fire. When these passive fire protection systems are subjected to heat and temperatures, such as those encountered in a fire, these intumescent materials react, grow and expand forming a char (many times the original thickness of the coating applied) to insulate the surface to which the material is applied from the damaging effects of the heat generated by the fire.

While these materials can be quite effective as fire barriers, these intumescent materials can be corrosive to steel, stainless steel, copper, aluminum and other metals or metal alloys, such as those commonly used in the construction industry. Thus, in applications, where these intumescent materials come in contact with metal components, e.g. metal fasteners such as screws or nails used to secure gypsum board to framing members, metal framing members and other metal structural members or utilities such as piping and the like, the use of these intumescent materials can cause corrosion problems and although the disclosure of the '644 patent has been available to the construction industry for over twenty five years, gypsum boards for ceiling applications and ceilings are still constructed using standard or fiber reinforced gypsum board without any fire-resistive barrier.

SUMMARY OF THE INVENTION

The gypsum board/intumescent material ceiling boards and ceilings of the present invention provide a solution to the need to replace a ceiling when the wrong type of gypsum boards are used for a particular application and can be used to further enhance the fire-resistive properties of ceilings using the type of gypsum boards normally specified or required for particular applications. The gypsum board/intumescent material ceiling boards of the present invention and forming the ceilings of the present invention each include a gypsum board and a fire-resistive barrier. A first major surface of the gypsum board is an upper side for abutting framing and a second major surface of the gypsum board is an underside for facing a room interior. The fire-resistive barrier is a layer of intumescent coating material applied to and coextensive with the first and/or second major surface of the gypsum board. The intumescent coating material contains expandable graphite and a corrosion inhibitor in sufficient quantities to provide a corrosion inhibiting layer on metal surfaces, such as the surfaces of metal fasteners, with which the intumescent coating material comes in contact. In addition, the intumescent coating material has a pH greater than 7.0 to reduce corrosive properties of the intumescent material and provide a chemical environment conducive to the forming of the corrosion inhibiting layer by the corrosion inhibitor.

The fire-resistive barrier can be applied to the first or second major surface of a gypsum board or to both major surfaces of the gypsum board prior to installing the ceiling board (e.g. by spraying or otherwise coating the major surface or surfaces of the gypsum board with the intumescent coating material in the same process where the gypsum board is produced or at a job shop) or the fire-resistive barrier can be applied to the second major surface of a gypsum board after the installation of the gypsum board in a ceiling structure (e.g. by spraying, brushing or otherwise applying the intumescent coating material to the second major surface of the gypsum board).

DESCRIPTION OF THE PREFERRED EMBODIMENTS

Figure 1:
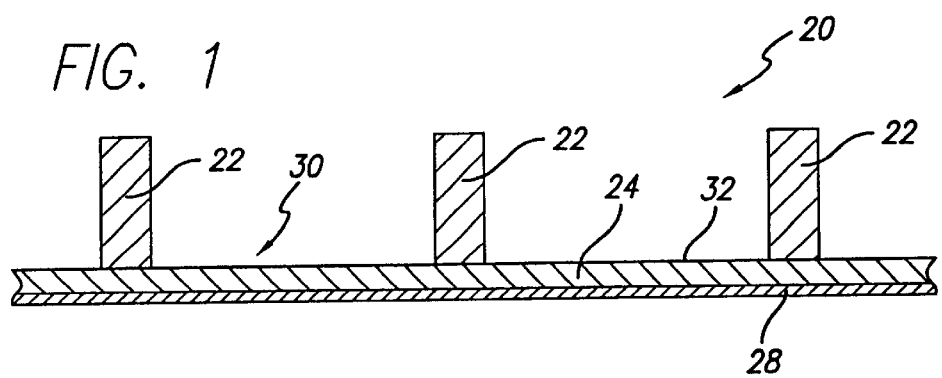
FIG. 1 is a partial transverse vertical cross section through a gypsum board/intumescent material fire-resistive ceiling of the present invention.

As shown in FIGS. 1, 2, 3 and 5, the gypsum board/ intumescent material fire-resistive ceiling of the present invention 20 includes spaced apart, horizontally extending wooden or metal framing members 22 with one layer of gypsum board 24 secured to the underside of each of the framing members 22 by metal screws, nails or other conventional mechanical fasteners 26. In addition, the gypsum board/intumescent material fire-resistive ceiling 20 also includes a fire-resistive barrier formed by one or two layers 28 of intumescent material. Preferably, the layer or layers 28 of intumescent material forming the fire-resistive barrier are coextensive in width and length with the fire-resistive ceiling 20. Preferably, the gypsum board/intumescent material fire-resistive ceiling 20 of the present invention provides a fire-resistive barrier ceiling with fire-resistive properties meeting or exceeding ASTM test standards E 119 for ceiling structures.

Figure 2:
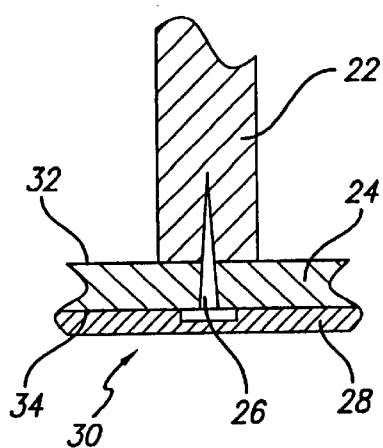
FIG. 2 is a partial transverse vertical cross section through the gypsum board/intumescent material fire-resistive ceiling of FIG. 1, wherein the fire-resistive layer of intumescent material has been applied to the gypsum board after the gypsum board has been secured to the framing members with metal fasteners.
Figure 3:
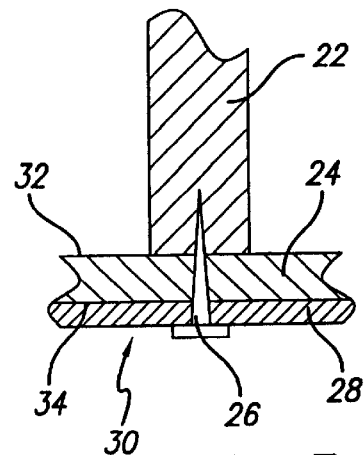
FIG. 3 is a partial transverse vertical cross section through the gypsum board/intumescent material fire-resistive ceiling of FIG. 1, wherein the fire-resistive layer of intumescent material has been applied to the gypsum board prior to securing the gypsum board to the framing members with metal fasteners.
Figure 4:
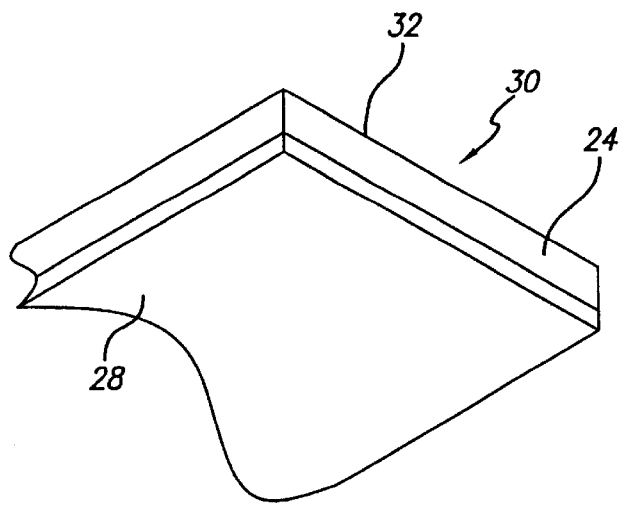
FIG. 4 is a partial perspective view of a gypsum board/ intumescent material ceiling board of the present invention.
Figure 5:
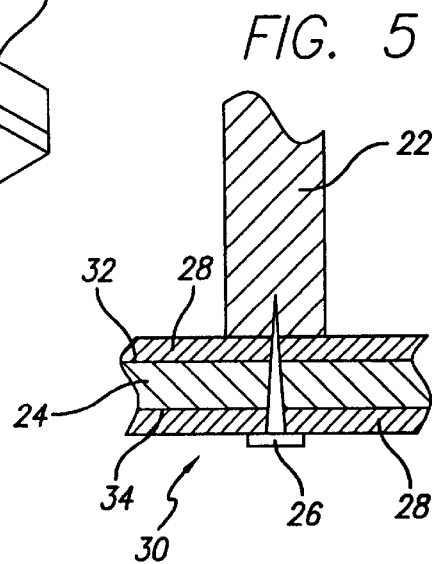
FIG. 5 is a partial transverse vertical cross section through a gypsum board/intumescent material fire-resistive ceiling of the present invention wherein a fire-resistive layer of intumescent material has been applied to both major surfaces of the gypsum board.

As shown in FIG. 4, a gypsum board/intumescent material ceiling board of the present invention 30 includes both the gypsum board 24 and the fire-resistive barrier formed by at least one layer 28 of intumescent material. The gypsum board 24 shown in FIG. 4 has an upper major surface or upper side 32 which abuts the undersides of the wooden or metal framing members 22 when the gypsum board/ intumescent material ceiling board 30 is installed, as shown in FIGS. 2 and 3, and a lower major surface or underside 34 which has the layer 28 of intumescent material thereon to form the fire-resistive barrier. Although the gypsum board/ intumescent material ceiling boards 30 in FIGS. 2 and 3 have been shown installed with the intumescent material layers 28 on the underside of the boards 30, the board 30 of FIG. 3 with the pre-applied layer of intumescent material can also be installed with the intumescent material layer 28 on the upper side of the board and abutting the undersides of the framing members 22. FIG. 5 shows a gypsum board/ intumescent material ceiling board 30 with intumescent material layers 28 that have been pre-applied to both the upper and the lower major surfaces of the gypsum board. Preferably, the intumescent material layers 28 have thicknesses between about 15 mils and about 50 mils and are coextensive in width and length with the lower or upper major surfaces of the gypsum boards. The preferred intumescent materials used for intumescent material layer or layers 28 will be discussed in detail below.

The gypsum boards 24 used in the gypsum board/ intumescent material ceiling boards 30 of the present invention are typically about four feet wide by eight or sixteen feet long. Several types of gypsum boards may be used for the fire-resistive ceilings 20 of the present invention. The first type of gypsum board 24 is a regular gypsum board, such as that marketed by GP Gypsum Corporation as regular gypsum board under the trademark "GyProc" for use in wall and ceiling applications. The regular gypsum boards have noncombustible, dimensionally stable non-reinforced gypsum cores. The second type of gypsum board 24 is a ceiling gypsum board, such as that marketed by GP Gypsum Corporation as a ceiling board under the trademarks "GyProc" "CD Ceiling Board" for use in ceiling applications. For comparable thicknesses, the ceiling gypsum boards are heavier than the regular gypsum boards and have noncombustible, dimensionally stable gypsum cores that are reinforced, e.g. with inorganic glass fibers. The third type of gypsum board 24 is a gypsum board with a fire-resistive rating, such as that marketed by GP Gypsum Corporation under the trademarks "GyProc" "Fireguard" and "Fireguard" C gypsum board for use in wall and ceiling applications. For comparable thicknesses, the fire-resistive rated gypsum boards are heavier than either the regular gypsum boards or the ceiling gypsum boards and have noncombustible, dimensionally stable gypsum cores that are reinforced, e.g. with inorganic glass fibers. While all of these gypsum boards have cores made of non-combustible materials, the cores of these gypsum boards are all heat degradable and, after various periods of time, fail from an exposure to the heat from a fire. Accordingly, the use of an intumescent material fire-resistive barrier on the underside of any of the above gypsum boards can enhance their fire-resistive performance.

The intumescent material layer 28 may be applied to a major surface of a gypsum board in various ways, such as but not limited to: a) spraying the major surface 32 or 34 of the gypsum board 24 with an intumescent coating material at the job site, a job shop or at the factory; b) using a doctor blade on a production line to level out and set the thickness of a pool of intumescent coating material distributed on the major surface 32 or 34 of the gypsum board being coated prior to passing the gypsum board beneath the doctor blade; or c) by brushing an intumescent coating material onto the major surface 32 or 34 of the gypsum board. The layer 28 of intumescent material may also be a woven or non-woven mat layer either coated with an intumescent coating material or having expanded particulate graphite dispersed throughout the mat. The mat is directly applied and adhesively or otherwise secured to one or both major surfaces of the gypsum board.

The gypsum board 24 can be secured to the undersides of the framing members 22 by the metallic fasteners 26 prior to the application of the layer 28 of intumescent material as shown in FIG. 2, such as when the layer 28 of intumescent material is applied to the underside of the gypsum board at the job site, or the gypsum board 24 can be secured to the undersides of the framing members 22 by the metallic fasteners 26 after the application of the layer or layers 28 of intumescent material as shown in FIGS. 3 and 5, such as when the layer or layers of intumescent material are applied to gypsum board at the factory. In either case, the intumescent material of layer(s) 28 are placed in contact with the surfaces of the metallic fasteners 26. Accordingly, it is important that the contact of the intumescent material layer 28 with the metallic fasteners 26 does not corrode the metallic fasteners and cause a failure of the ceiling.

The preferred intumescent material used in the fire-resistive ceiling 20 of the present invention includes expandable particulate graphite. This preferred intumescent material is a coating material containing expandable particulate graphite and a corrosion inhibitor that is applied directly to the major surface or surfaces of the gypsum board 24.

Expandable particulate graphite, as used in the preferred intumescent material of the present invention, is prepared from particulate, naturally occurring crystalline flake graphite or crystalline lump graphite, that has been acid treated to make the particulate graphite intumescent. Preferably, the particulate is naturally occurring crystalline flake graphite. In the production of a preferred form of the expandable particulate graphite, it is believed that the treatment of the crystalline flake graphite or crystalline lump graphite with concentrated sulfuric acid in the presence of an oxidizing agent, such as nitric acid, forms the compound graphite sulfate which exfoliates and expands when exposed to a flame or any other heat source having a temperature of about 150° C. or greater. When exposed to temperatures of 150° C. or greater, the expandable particulate graphite used in the intumescent material of the present invention expands from about 20 to about 200 times its unexpanded volume to fill voids, joint seams and cavities, form fire-resistive layers, and otherwise form firestopping or fire-resistive barriers.

One method of preparing the naturally occurring crystalline flake graphite or crystalline lump graphite to make the particulate graphite expandable is disclosed in U.S. Pat. No. 3,574,644; issued Apr. 13, 1971; Franciszek Olstowski et al (the disclosure of U.S. Pat. No. 3,574,644, is hereby incorporated herein by reference in its entirety). As set forth in the '644 patent, the method includes contacting the particulate graphite, at about room temperature, (1) with a mixture of from about 8 to about 98 weight percent concentrated sulfuric acid (at least about 90 weight percent $H_2SO_4$) and from about 92 to about 2 weight percent concentrated nitric acid (at least about 60 weight percent $HNO_3$), or (2) with fuming nitric acid, or (3) with fuming sulfuric acid, or (4) with concentrated sulfuric acid (at least about 90 weight percent $H_2SO_4$) or concentrated nitric acid (at least 60 weight percent $HNO_3$), plus at least about 2 weight percent of a solid inorganic oxidizer, such as, for example, manganese dioxide, potassium permanganate, potassium chlorate, chromium trioxide, and the like. The resulting mix components usually are employed on a weight proportion basis from about 0.2–2/1 (acid member/graphite). These are maintained in contact for at least about one minute, although a contact time of hours or days is not detrimental. The acid treated graphite particulate, now expandable, is separated from any excess acid, water washed and dried.

In the preferred intumescent material used in the present invention, any residual acid or acid components are removed from the expandable particulate graphite, preferably by washing the expandable particulate graphite with water, to increase the pH of the expandable particulate graphite to about 7.0 and eliminate or essentially eliminate potential corrosive agents from the expandable particulate graphite. If the residual acid or acid components are not removed from the expandable particulate graphite prior to introducing the expandable particulate graphite into and mixing the expandable particulate graphite with the carrier, the corrosion inhibitor (e.g. sodium hexa meta phosphate) in the carrier can change the acid residue or acid components on the expandable particulate graphite into salt so that these corrosive agent is still present in the intumescent material in some form.

In the preferred method of making the intumescent material used in the present invention, after the expandable particulate graphite has been thoroughly washed, the expandable particulate graphite is added to a liquid carrier, such as a coating forming carrier, containing a corrosion inhibitor and, in most embodiments, a filler. As mentioned above, the preferred intumescent material used in the fire-resistive ceiling boards and ceilings of the present invention (the carrier with the expandable particulate graphite, the corrosion inhibitor and filler, if used) has a pH greater than 7.0, preferably between about 7.5 and about 10.0 and most preferably, between about 8.0 and about 8.5, to reduce the corrosive properties of the intumescent material with respect to most metals used in the construction industry, except aluminum, (e.g. steel, stainless steel, and copper) and to provide a chemically conducive environment for the corrosion inhibitor to form a protective layer on any metal with which the intumescent material comes in contact to prevent or greatly reduce corrosion. If the pH of the liquid carrier, to which the expandable particulate graphite is to be added, is not within the ranges set forth above, a pH enhancer (basic material), such as but not limited to ammonium hydroxide or other hydroxides, can be added directly to the carrier or applied to the washed expandable particulate graphite, prior to introducing the expandable particulate graphite into the carrier, to bring the intumescent material of the present invention within the required pH range.

Preferably, the corrosion inhibitor, in or added to the carrier, is sodium hexa meta phosphate (which appears to work the best), sodium meta phosphate, sodium silicate or other sodium based phosphate compounds. At the pH levels used in the intumescent material of the present invention (i.e. above 7.0, preferably between about 7.5 and about 10.0 and most preferably, between about 8.0 and about 8.5) the phosphate or silicate precipitates out of the carrier to form a phosphate or silicate corrosion inhibiting layer on a metal surface that prevents oxygen from diffusing onto the metal surface. The corrosion inhibitors, listed above, function to form a protective layer when the pH is above 7.0. However, the corrosion inhibitors listed above, function better to form a protective layer when the pH of the intumescent material is between 7.5 and 10.0 and function best to form a protective layer when the pH level of the intumescent material is between about 8.0 and 8.5. Preferably, the corrosion inhibiting properties of the intumescent material of the present invention meet or exceed the following standards, ASTM C665.

The corrosion inhibitor can be introduced into the carrier in dry or solution form and is present in the carrier in sufficient quantities to form a protective layer on any metal brought into contact with the intumescent material, such as metal screws, nails or other metallic mechanical fasteners, metal studs or framing members, piping and other utilities, etc., to prevent or inhibit corrosion. For example, a carrier, such as an acrylic latex carrier, including between about 200 parts per million and about 10,000 parts per million sodium hexa meta phosphate and having a pH between about 7.5 and about 10.0 has been found to produce a satisfactory corrosion inhibiting layer and a carrier, such as an acrylic latex carrier, including between about 1,000 parts per million and about 2,000 parts per million sodium hexa meta phosphate and having a pH between about 8.0 and about 8.5 has been found to produce a satisfactory corrosion inhibiting layer.

The liquid carrier used in the preferred intumescent material of the present invention is a coating forming carrier, such as but not limited to, acrylic latexes, vinyl latexes, butadiene-styrene latexes, alkyl paints, epoxy solutions, urethane solutions, varnishes, lacquers. The viscosity of the carrier can be adjusted, as required, for type of coating or spray application being used, e.g. by regulating the amount of water or solvent added to the carrier.

To reduce the cost of the intumescent material of the present invention, many of the embodiments of the present invention include a filler, preferably an inorganic filler. For example, fillers which can be used in the intumescent material of the present invention include, but are not limited to, calcium carbonate, magnesium carbonate, dolomite and various clays commonly used as fillers.

In embodiments of the preferred intumescent material for the fire-resistive ceiling boards and ceilings of the present invention which include a liquid carrier and the expandable particulate graphite, but no fillers, the intumescent material is between about 40 and about 90 weight percent liquid carrier and between about 10 and 60 weight percent expandable particulate graphite. In embodiments of the intumescent material of the present invention which include fillers, the liquid carrier is between about 20 and about 60 weight percent of the intumescent material; the expandable particulate graphite is between about 10 and about 30 weight percent of the intumescent material; and the filler is between about 10 and about 50 weight percent of the intumescent material. In the preferred embodiments of the present invention which include fillers, the liquid carrier is between about 45 and about 55 weight percent of the intumescent material; the expandable particulate graphite is between about 10 and about 20 weight percent of the intumescent material; and the filler is between about 25 and about 40 weight percent of the intumescent material.

While not shown in FIGS. 1–5, the ceilings 20 will typically have primers and final decorative coatings applied over the exposed surface of the intumescent material layer 28. In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A gypsum board/intumescent material ceiling board comprising:

a gypsum board with a gypsum core; the gypsum core having first and second major surfaces; the first and second major surfaces each having a width and a length; the first and second major surfaces having facings thereon; and the first major surface being an upper side of the gypsum board for abutting framing and the second major surface being an underside of the gypsum board for facing a room interior; and a fire-resistive barrier, the fire-resistive barrier being a layer of intumescent coating material applied to one of the major surfaces of the gypsum board; the intumescent coating material including a carrier, expandable graphite and a corrosion inhibitor to provide a corrosion inhibiting layer on a metal surface with which the intumescent coating material comes in contact; the corrosion inhibitor being selected from a group consisting of sodium hexa meta phosphate, sodium meta phosphate, sodium silicate and other sodium based phosphate compounds and the carrier including between about 200 and about 10,000 parts per million corrosion inhibitor; the intumescent coating material having a pH between 8.0 and 8.5 to reduce corrosive properties of the intumescent coating material and provide a chemical environment conducive to the forming of the corrosion inhibiting layer by the corrosion inhibitor; and the fire-resistive barrier being coextensive in width and length with the width and length of the second major surface of the gypsum board.

2. The gypsum board/intumescent material ceiling board according to claim 1, wherein: a liquid carrier containing the corrosion inhibitor is between about 40 and about 90 weight percent of the intumescent coating material; the expandable particulate graphite is between about 10 and about 60 weight percent of the intumescent coating material.

3. The gypsum board/intumescent material ceiling board according to claim 1, wherein: a liquid carrier containing the corrosion inhibitor is between about 45 and about 55 weight percent of the intumescent material; the expandable particulate graphite is between about 10 and about 20 weight percent of the intumescent material; and a filler is between about 25 and about 40 weight percent of the intumescent material.

4. The gypsum board/intumescent material ceiling board according to claim 3, wherein: the expandable particulate graphite is expandable flake graphite; and the filler is an inorganic filler.

5. The gypsum board/intumescent material ceiling board according to claim 1, wherein: the gypsum board is a non-reinforced gypsum board; and the expandable particulate graphite is expandable flake graphite.

6. The gypsum board/intumescent material ceiling board according to claim 1, wherein: the fire-resistive barrier is a layer of intumescent coating material on the second major surface of the gypsum board.

7. The gypsum board/intumescent material ceiling board according to claim 1, wherein: the fire-resistive barrier is a layer of intumescent coating material applied to each of the major surfaces of the gypsum board.

8. A gypsum board/intumescent material ceiling comprising:

spaced apart parallel framing members;

a plurality of gypsum boards secured to the framing members by metal fasteners; each gypsum board having a gypsum core; the gypsum core having first and second major surfaces; the first and second major surfaces each having a width and a length; the first and second major surfaces having facings thereon; and the first major surface being an upper side of the gypsum board abutting the framing and the second major surface being an underside of the gypsum board facing a room interior; and a fire-resistive barrier, the fire-resistive barrier being a layer of intumescent coating material applied to one of the major surfaces of each of the gypsum boards; the intumescent coating material including a carrier, expandable graphite and a corrosion inhibitor to provide a corrosion inhibiting layer on surfaces of the metal fasteners with which the intumescent coating material comes in contact; the corrosion inhibitor being selected from a group consisting of sodium hexa meta phosphate, sodium meta phosphate, sodium silicate and other sodium based phosphate compounds and the carrier including between about 200 and about 10,000 parts per million corrosion inhibitor; the intumescent coating material having a pH between 8.0 and 8.5 to reduce corrosive properties of the intumescent coating material and provide a chemical environment conducive to the forming of the corrosion inhibiting layer by the corrosion inhibitor; and the fire-resistive barrier being coextensive in width and length with the width and length of the second major surface of the gypsum board.

9. The gypsum board/intumescent material ceiling according to claim 8, wherein: a liquid carrier containing the corrosion inhibitor is between about 40 and about 90 weight percent of the intumescent coating material; the expandable particulate graphite is between about 10 and about 60 weight percent of the intumescent coating material.

10. The gypsum board/intumescent material ceiling according to claim 8, wherein: a liquid carrier containing the corrosion inhibitor is between about 45 and about 55 weight percent of the intumescent material; the expandable particulate graphite is between about 10 and about 20 weight percent of the intumescent material; and a filler is between about 25 and about 40 weight percent of the intumescent material.

11. The gypsum board/intumescent material ceiling board according to claim 10, wherein: the expandable particulate graphite is expandable flake graphite; and the filler is an inorganic filler.

12. The gypsum board/intumescent material ceiling according to claim 8, wherein: the gypsum board is a non-reinforced gypsum board; and the expandable particulate graphite is expandable flake graphite.

13. The gypsum board/intumescent material ceiling according to claim 8, wherein: the fire-resistive barrier is on the second major surface of each of the gypsum boards.

14. The gypsum board/ intumescent material ceiling according to claim 8, wherein: the fire-resistive barrier is a layer of intumescent coating material applied to each of the major surfaces of each of the gypsum boards.

* * * * *